(12) United States Patent
Menges et al.

(10) Patent No.: US 7,804,643 B2
(45) Date of Patent: Sep. 28, 2010

(54) RETICLE AND USE THEREOF FOR AN AIMING TELESCOPE

(75) Inventors: Dietmar Menges, Absam (AT); Alois Zangerl, Kramsach (AT)

(73) Assignee: Swarovski Optik K.G., Absam I., Tirol (AT)

( * ) Notice: Subject to any disclaimer, the term of this patent is extended or adjusted under 35 U.S.C. 154(b) by 819 days.

(21) Appl. No.: 11/258,005

(22) Filed: Oct. 26, 2005

(65) Prior Publication Data

US 2006/0092507 A1      May 4, 2006

(30) Foreign Application Priority Data

Oct. 29, 2004   (EP) .................................. 04025836

(51) Int. Cl.
  *G02B 23/00*  (2006.01)
  *F41G 1/38*  (2006.01)
(52) U.S. Cl. .................. 359/424; 359/399; 42/122; 42/123
(58) Field of Classification Search ......... 359/399–428, 359/850–861
  See application file for complete search history.

(56) References Cited

U.S. PATENT DOCUMENTS

| 2,472,809 | A | | 6/1949 | Decker | |
|---|---|---|---|---|---|
| 3,121,163 | A | * | 2/1964 | Rickert | 250/467.1 |
| 3,853,398 | A | * | 12/1974 | Kano | 355/43 |
| 3,988,059 | A | * | 10/1976 | Johnson | 353/122 |
| 4,214,371 | A | | 7/1980 | Bush | |
| 4,665,622 | A | | 5/1987 | Idan et al. | |
| 5,065,520 | A | * | 11/1991 | Shimizu et al. | 42/123 |
| 5,640,284 | A | * | 6/1997 | Tanitsu et al. | 359/869 |
| 6,094,305 | A | * | 7/2000 | Shiraishi | 359/558 |
| 2002/0080480 | A1 | | 6/2002 | Stingl | |
| 2003/0086165 | A1 | * | 5/2003 | Cross et al. | 359/424 |
| 2004/0075047 | A1 | * | 4/2004 | Schnitzlein et al. | 250/234 |
| 2009/0109529 | A1 | * | 4/2009 | Robitaille | 359/428 |

FOREIGN PATENT DOCUMENTS

| DE | 29903989 U1 | 6/1999 |
|---|---|---|
| DE | 10051448 A1 | 10/2000 |
| EP | 0267 599 A2 | 5/1988 |
| EP | 0718585 B1 | 4/1998 |
| EP | 0 886 163 A2 | 12/1998 |
| EP | 1 653 271 A1 | 3/2006 |
| GB | 1 532 401 | 11/1978 |

OTHER PUBLICATIONS

Schröder, G., Technische Optik, 2.6 Anwendung Asphärischer Flächen, Technische Optik. Grandlagen Und Anwendungen, Würburg, Vogel Buchverlag, DE, 1990, Steiten.

* cited by examiner

*Primary Examiner*—Thong Nguyen
(74) *Attorney, Agent, or Firm*—Milbank, Tweed, Hadley & McCloy, LLP

(57) ABSTRACT

An illuminable reticle (1) has a minor (5) disposed laterally beside the carrier (2) and having two foci (8 and 9). The light source (6) is disposed in one focus (8). The line image (3) is disposed in the second focus (9), whereby optionally a total reflection on one of the two carrier surfaces is also possible for focusing light beams (12) in the line image (3).

21 Claims, 2 Drawing Sheets

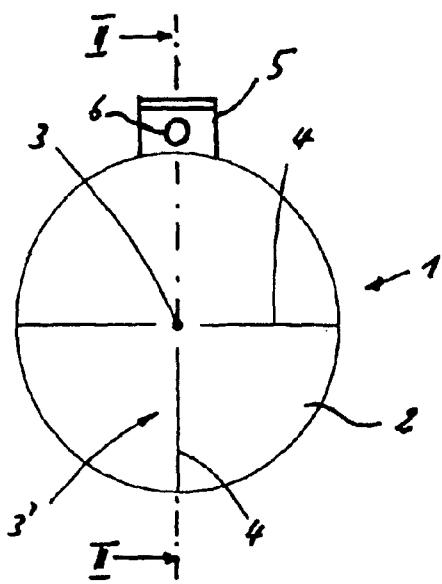
FIG 1
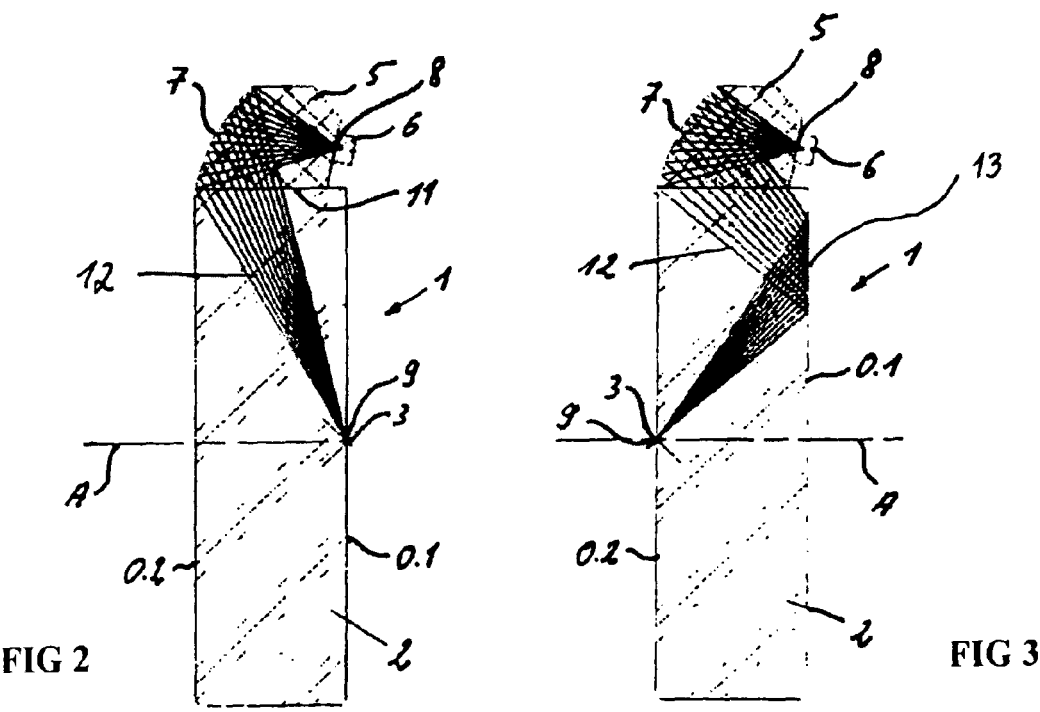
FIG 2
FIG 3

RETICLE AND USE THEREOF FOR AN AIMING TELESCOPE

TECHNICAL FIELD OF THE INVENTION

This invention relates to a reticle comprising a carrier and a line image provided on the surface of the carrier, said image radiating light from a laterally disposed light source perpendicular to the carrier surface.

BACKGROUND OF THE INVENTION

Reticles are provided in the observation beam path of optical observation and aiming devices, in particular aiming telescopes. The visible target marking applied to the carrier is referred to here as the line image. When hunting at dawn or dusk it is often impossible to recognize the line image against the dark body of game. Therefore, various solutions have been proposed for illuminating the line image. It is thus known to etch the line image into the carrier formed as a glass plate and fill it with pigments. Illumination with a light source causes it to stand out brightly from the background due to light scattering and light diffraction of the filing material. However, with the known reticle only a very small portion of light is deflected in the direction of the observer. According to EP 0 886 163 B1 the line image used is therefore a diffraction grating which is applied to the carrier. Here the fact is utilized that according to the theory of diffraction the first order has a particularly high light intensity. Thus, the brightness of the illuminated line image is improved somewhat, but light is not radiated uniformly, that is, brightness is dependent on viewing direction. Also, only a very small portion of the optical power produced is deflected in the viewing direction.

Further, it is known from DE 10 051 448 A1 to frame the carrier with a light guide which is illuminated by the light source. Since light is thus steered into an oversized solid angle, the energy consumption is considerable for sufficient brightness. According to DE 29 903 989 U1 a line image, namely a target marking in the center of the reticle, is projected into a further line image applied to the carrier in the form of cross-lines by a projection device disposed laterally on the reticle via a beam splitter in the observation beam path on the carrier. This obtains a bright line image, but the space requirements and weight are considerable. Moreover, light transmission is reduced by the splitter layer between the two prisms of the beam splitter. It is also difficult to adjust the two line images relative to each other. EP 0718 585 B1 discloses a reticle having, as a target marking, an illuminated ring with bars which are provided with a reflection surface at the tip to form illuminated dots.

SUMMARY OF THE INVENTION

The present invention describes a reticle with an illuminated line image incorporated for example in the sighting optics of an aiming telescope with minimal energy consumption, without appreciable additional space requirements, economically, with maximum brightness, and uniformly, that is, independently of the viewing direction. The present invention also describes a method for illuminating a line image in a reticle.

DETAILED DESCRIPTION OF THE INVENTION

According to the invention, a mirror is disposed laterally beside the carrier of the reticle and has a mirror surface curved in such a way that the mirror has two foci. The light source is located in, or at least in the area of, one focus. Light beams reflected by the mirror converge to the line image which is located in the area of the second focus. The line image can be located either on the first surface or on the second surface of the reticle. The line image on the first surface can be reached directly by the light beams. The line image on the second surface of the reticle is reached by total reflection of light beams on the first surface of the reticle.

The mirror surface concavely curved in cross section can be formed as an ellipsoid, but any other spherically curved mirror surface having two foci can also be used. One of the foci also can be located in infinity, since illumination of the line image with a parallel beam path is also possible.

The mirror surface is preferably provided on the back of the mirror illuminated by the light source from the front. The back of the mirror can face the eyepiece 7A (FIG. 1A). The mirror can be formed as a plastic part. The light source used is preferably a light-emitting diode. The carrier of the line image is preferably glass or a transparent material.

The mirror can be spaced from the reticle, but it is preferably fastened thereto, in particular by bonding.

The illuminated line image of the present invention, can be in the form of a dot in the center of the reticle. In addition, the reticle can have any desired second line image for example in the form of cross-lines, in particular with a central vertical bar between two crossbars.

The illuminated line image can be formed by a diffractive and/or scatting microstructure for example by etching or a diffraction grating on the carrier surface. In the case of an etched or worked-in line image, a filling material comprising pigments can be inserted into the formed depression so that the line image stands out brightly from the background when illuminated by the light source due to light radiation and light diffraction on the pigments. The pigments used may be photoluminescent pigments which emit e.g. visible light under UV irradiation.

The line image comprising a diffraction grating can be formed according to EP 0 886 163 B1. That is, it can consist of alternately disposed transparent gaps and opaque bars. The ratio of width of the bars to width of the gaps is preferably greater that or equal to 1:1. The grating period of the amplitude grating, according to the diffraction formula is dependent on the light wavelength, the angle of entering and exiting light and on the refractive index of the air and the material of the carrier.

Through the focusing of light on the line image, a line image with high luminance is obtained according to the invention. For uniform brightness distribution over the viewing angle, light exiting from the line image preferably has the same angle of beam spread as the downstream observation optics, that is, the eyepiece. This is obtained by the mirror and its design together with the diffraction grating.

The line image radiates light from the laterally disposed light source preferably perpendicular to the carrier surface. However, angles other than 90 degrees are also possible with a diffraction grating. It must also be taken into account that beams exit at a certain angle of beam spread.

The reticle of the present invention involves bright, uniform illumination of the line image. Since focusing and deflection of light are effected with one component, namely the mirror, the overall volume is small. Since the mirror used can be for example a mirror-plated plastic part, the additional costs are low. Moreover, the reticle of the present invention permits versatile design of the line image. The high efficiency permits a corresponding reduction in energy consumption.

BRIEF DESCRIPTION OF THE DRAWINGS

Hereinafter the invention will be explained in more detail by way of example with reference to the enclosed drawing, in which

FIG. 1 shows a plan view of a reticle;

FIG. 2 shows a section along the line II-II in FIG. 1;

FIG. 3 shows a section through another embodiment.

DETAILED DESCRIPTION OF THE DRAWINGS

Figure 1A:
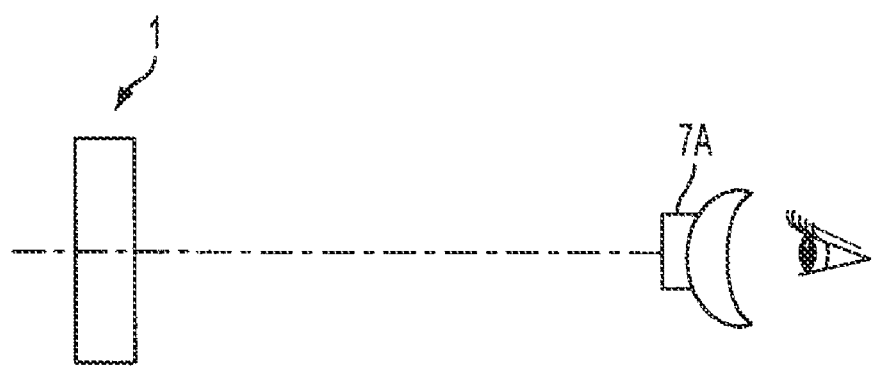
FIG. 1A shows a schematic view of a user looking through an eyepiece toward a reticle.

According to FIG. 1, the reticle 1 has a carrier 2 in the form of a circular disk made of glass or another transparent material. Provided on the carrier 2 in the optical axis A is a line image 3 in the form of a dot. The line image 3 can be formed by an etched pigment-filled depression in the surface of the carrier 2 or by a diffraction grating on the surface. A second line image 3' is applied to the carrier 2 in the form of crosslines consisting of three bars 4, namely a central vertical bar between two cross-bars which are aligned with the line image 3 in the center of the reticle 1.

According to FIGS. 1 and 2, a mirror 5 is bonded laterally to the reticle 1. An LED is fastened to the front of the mirror 5 as the light source 6.

The back of the mirror is formed as an ellipsoid surface and mirror-plated so as to form a ellipsoidal mirror surface 7.

The mirror surface 7 has two foci 8 and 9 according to FIG. 2. The light source 6 is disposed in one focus 8, while the line image 3 is located on the surface 0.1 of the carrier 2 in the second focus 9. For stable fastening of the mirror 5 to the carrier 2, a bonded joint 11 is provided. With increasing radial distance from the carrier 2, the spherically curved mirror surface 7 extends towards the front away from the surface 0.2.

While in the embodiment according to FIG. 3 the line image 3 is disposed in the area of the second focus 9 of the mirror surface 7 which is located on the carrier surface 0.1 also facing the light source 6 on the mirror 5, light beams 12 passing from the mirror surface 7 to the second focus are subjected to total reflection 13 on the carrier surface 0.1 to converge to the line image 3 disposed on the other carrier surface 0.2.

The invention claimed is:

1. An observation and aiming device comprising a reticle (1) and an eyepiece (7A), said reticle having an optical axis (A) and comprising a carrier (2) having two surfaces and an image (3) provided on one surface (0.1, 0.2) of the carrier, said image radiating light from a light source (6) disposed laterally of said one carrier surface and said optical axis (A); a mirror (5), having a mirror surface (7), fastened to said carrier (2) and having two foci (8 and 9) wherein said light source (6) is disposed in the area of said first focus (8), and light beams (12) passing said second focus (9) illuminate said image (3).

2. The observation and aiming device according to claim 1, wherein said image (3) is disposed in the area of said second focus (9).

3. The observation and aiming device according to claim 1, wherein said mirror surface (7) of said mirror (5) is formed as an ellipsoid.

4. The observation and aiming device according to claim 1, wherein said mirror surface (7) is provided on the back of said mirror (5) illuminated by said light source (6) from the front.

5. The observation and aiming device according to claim 1, wherein said image (3) is formed by a diffractive or scattering microstructuring on said one carrier surface.

6. The observation and aiming device according to claim 1, wherein the carrier is a transparent material.

7. The observation and aiming device according to claim 1, wherein said carrier is glass.

8. The observation and aiming device according to claim 1, wherein the mirror is plastic.

9. The observation and aiming device according to claim 1, wherein the light source is a light-emitting diode.

10. The observation and aiming device according to claim 1, wherein said image is a dot.

11. The observation and aiming device according to claim 1, wherein the image is a line.

12. An observation and aiming device according to claim 1, wherein said device is an aiming telescope.

13. An observation device comprising a reticle (1), said reticle comprising a carrier (2) having two surfaces and an image (3) provided on one surface (0.1, 0.2) of the carrier, said image radiating light from laterally disposed light source (6) to said one carrier surface; a mirror (5), having a mirror surface (7), fastened to said carrier (2) and having two foci (8 and 9) wherein said light source (6) is disposed in the area of said first focus (8), and light beams (12) passing said second focus (9) illuminate said image (3), wherein said light beams (12) passing to said second focus (9) converge after total reflection (13) on one of said two carrier surfaces (0.1) in the area of said image (3) disposed on said other carrier surface (0.2).

14. The observation device according to claim 13, wherein said image is a dot.

15. The observation device according to claim 13, wherein the image is a line.

16. The observation device according to claim 13, wherein the image is filled with pigment.

17. The observation device according to claim 16, wherein the pigment is photoluminescent.

18. An observation device comprising a reticle (1), said reticle comprising a carrier (2) having two surfaces and an image (3) provided on one surface (0.1, 0.2) of the carrier, said image radiating light from laterally disposed light source (6) to said one carrier surface; a mirror (5), having a mirror surface (7), fastened to said carrier (2) and having two foci (8 and 9) wherein said light source (6) is disposed in the area of said first focus (8), and light beams (12) passing said second focus (9) illuminate said image (3), wherein the image is filled with pigment.

19. The observation device according to claim 18, wherein the pigment is photoluminescent.

20. An observation and aiming device comprising a reticle (1), said reticle having an optical axis (A) and comprising a carrier (2) having two surfaces and an image (3) provided on one surface (0.1, 0.2) of the carrier, said image radiating light from a light source (6) disposed laterally of said one carrier surface and said optical axis (A); a mirror (5), having a mirror surface (7), fastened to said carrier (2) and having two foci (8 and 9) wherein said light source (6) is disposed in the area of said first focus (8), and light beams (12) passing said second focus (9) illuminate said image (3), wherein said image (3) is formed by a diffractive or scattering microstructuring on said one carrier surface.

21. An observation and aiming device according to claim 20, wherein said device is an aiming telescope.

* * * * *